United States Patent [19]

Davies, Jr. et al.

[11] Patent Number: 5,283,792
[45] Date of Patent: Feb. 1, 1994

[54] POWER UP/POWER DOWN CONTROLLER AND POWER FAIL DETECTOR FOR PROCESSOR

[75] Inventors: William F. Davies, Jr., Carrollton; Ronald T. Taylor, Grapevine, both of Tex.

[73] Assignee: Benchmarq Microelectronics, Inc., Carrollton, Tex.

[21] Appl. No.: 601,248

[22] Filed: Oct. 19, 1990

[51] Int. Cl.$^5$ .............................................. G06F 11/00
[52] U.S. Cl. ....................................... 371/66; 395/575
[58] Field of Search ................................. 371/66, 57.1; 307/269 R; 364/273.4, 273.5, 268.5, 268.2, 285.1; 395/575

[56] References Cited

U.S. PATENT DOCUMENTS

| | | | |
|---|---|---|---|
| 4,096,560 | 6/1978 | Footh | 395/575 |
| 4,122,359 | 10/1978 | Breikss | 307/66 |
| 4,203,153 | 5/1980 | Boyd | 364/200 |
| 4,245,289 | 1/1981 | Mineck et al. | 363/41 |
| 4,327,410 | 4/1982 | Patel et al. | 364/200 |
| 4,422,163 | 12/1983 | Oldenkamp | 365/229 |
| 4,453,307 | 7/1984 | McAnlis et al. | 364/200 |
| 4,645,943 | 2/1987 | Smith, Jr. et al. | 307/150 |
| 4,730,121 | 3/1988 | Lee et al. | 307/66 |
| 4,812,677 | 3/1989 | Perry | 307/269 R |
| 4,816,862 | 3/1989 | Taniguchi et al. | 354/412 |
| 4,819,237 | 4/1989 | Hamilton et al. | 371/66 |
| 4,907,150 | 3/1990 | Arroyo et al. | 371/66 X |
| 4,959,774 | 9/1990 | Davis | 371/66 X |
| 5,012,406 | 4/1991 | Martin | 371/66 X |

Primary Examiner—Robert W. Beausoliel, Jr.
Assistant Examiner—Ly V. Hua
Attorney, Agent, or Firm—Ross, Howison, Clapp & Korn

[57] ABSTRACT

A power fail control system for a CPU (10) and external memory (16) utilizes a controller (18). The controller (18) is operable to detect an early power fail situation and output an interrupt to the CPU (10). The CPU (10) then goes into a power down sequence and stores critical instructions in an internal memory array (30) constituting a hidden memory during the power down sequence. An out of tolerance detector detects when the power supply voltage has fallen below a predetermined threshold and then generates reset signal. The reset signal is input to the CPU (10) to indicate that no further instructions are executable. In addition, a Chip Enable switch (46) is operated to inhibit memory control signals from being transferred from the CPU (10) to the memory (16). The internal hidden memory (30) is also inhibited from having data written thereto in the presence of the reset signal. A backup battery (22) is provided which is connected to one side of a switch. The other side of the switch is connected to the power supply voltage. When the power supply voltage falls below the battery voltage, the battery is connected to supply a current to the external memory (16).

40 Claims, 9 Drawing Sheets

POWER UP/POWER DOWN CONTROLLER AND POWER FAIL DETECTOR FOR PROCESSOR

TECHNICAL FIELD OF THE INVENTION

The present invention pertains in general to power fail detect circuitry for microprocessors, and more particularly, to a power fail detect circuit that protects vital instructions in a microprocessor instruction sequence in the event of a power failure and stores these instructions in a non-volatile memory for the power up operation.

BACKGROUND OF THE INVENTION

Data processing systems are conventionally configured with some type of central processing unit such as a microprocessor at the center thereof. During processing, instructions are executed and various levels of data are stored in internal registers. Some of these instructions and the data associated with the processing operation are stored in memory, which can be volatile or non-volatile. It has been recognized that power supply failure in systems of this type results in loss of the volatile instructions which are being executed by the microprocessor and also loss of data in the volatile memory storage devices. The loss of data stored in external volatile memory storage devices has been solved by providing battery backed-up systems that write protect the memory and then attach a back-up battery or some equivalent supply thereto. In this manner, the information which is stored in the memory prior to the write protect operation is maintained. However, this does not necessarily address the power down problem that exists with respect to the loss of power to the microprocessor.

The entire microprocessor system does not need the power maintained thereto, since only a small number of registers are involved with storage of the various instructions that are being executed, and since the amount of power drain associated with a microprocessor would be too great for a long-term battery back-up system. Therefore, systems have been developed to download the volatile memory information during a power failure. In these prior systems, early power failure is detected and then sufficient time is provided to execute an ordered shutdown routine, thereby leaving the system in condition for recovery of its interrupted operation on a restart after the power has been restored to the system. One type of system that provides a solution to this problem is disclosed in U.S. Pat. No. 4,458,307, issued Jul. 3, 1984 to J. C. McAnlis, et al. This system relates to a data processing system with a volatile main memory wherein an early power failure is detected and the volatile information downloaded to the main memory. If power deficiency persists, the main memory is backed up by a power source only if the data saving operation has been completed.

SUMMARY OF THE INVENTION

The present invention disclosed and claimed herein comprises a method and apparatus for controlling the operation of the central processing unit and associated external memory during power failure of an associated power supply. An early power fail detection circuit is provided for detecting a potential power supply failure in the power supply of the processor and generating a power fail signal for output to the processor. An out of tolerance detection circuit is provided for detecting when the power supply to the central processing unit is out of tolerance and generating an out of tolerance signal. A Write protect circuit Write protects the external memory in response to the generation of the out of tolerance signal. A backup battery is provided with an associated backup circuit that is operable to connect the battery to the power supply input of at least the external memory when the power supply is less than a predetermined backup voltage.

In another aspect of the present invention a Chip Enable switch is provided for receiving on an input thereto memory control signals from the central processing unit that control the operation of the external memory. The Chip Enable switch is operable to route the memory control signals to the memory in the absence of the out of tolerance signal and to inhibit the memory control signals from being input to the memory in the presence of the out of tolerance signal.

In yet another aspect of the present invention, a hidden memory is provided for storing critical instructions utilized by the central processing unit. Access circuitry allows the central processing unit to access the hidden memory when the central processing unit is powering down in response to the power fail signal. The hidden memory is Write protected such that writing of data thereto is inhibited when the out of tolerance signal is generated.

In a yet further aspect of the present invention, the hidden memory has an address space that occupies a predetermined portion of the address space of the external memory. During the power down sequence, the address space of the hidden memory is inserted into the address space of the external memory so as to replace the corresponding portion of the address space. In this manner, the central processing unit accesses the hidden memory by accessing its own address space.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
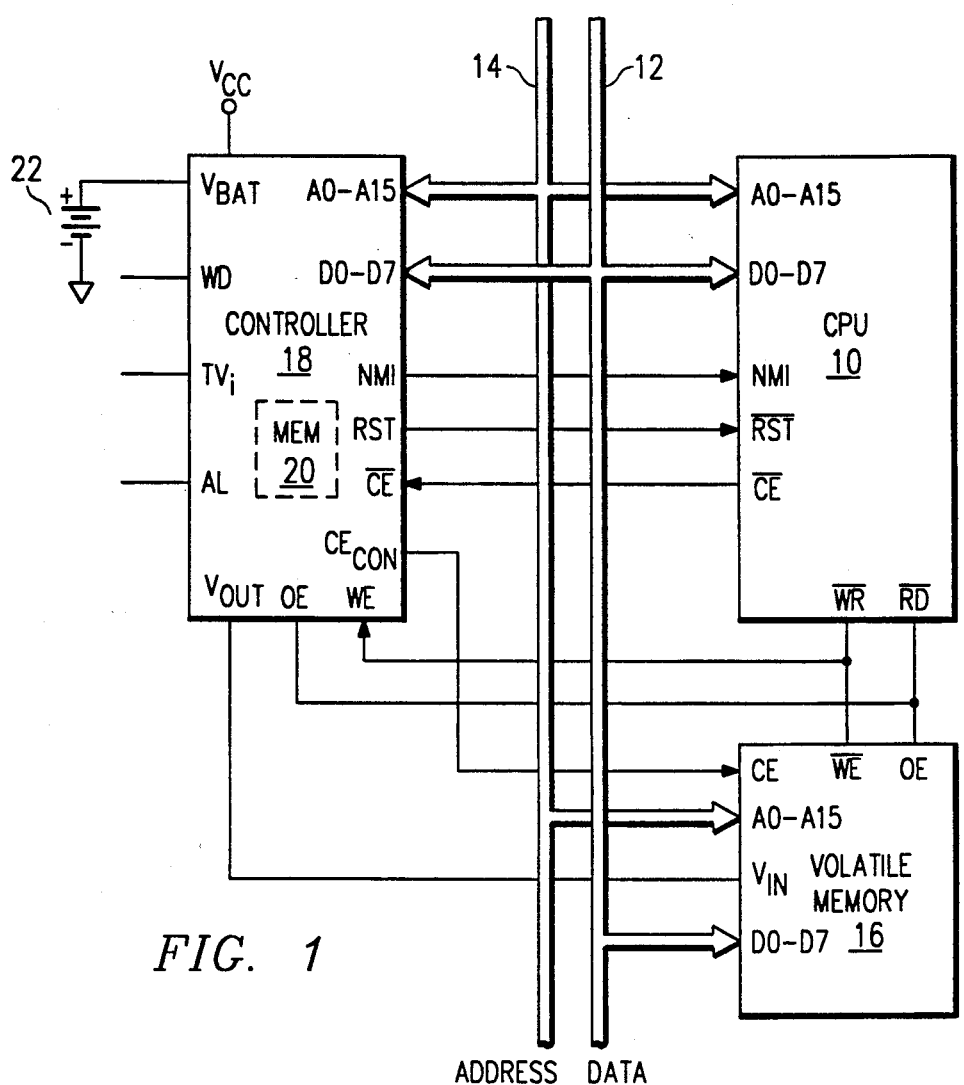
FIG. 1 illustrates a block diagram of the controller of the present invention interfaced with a CPU and a bank of volatile memory.

Referring now to FIG. 1, there is illustrated a block diagram of a system utilizing the present invention. A Central Processing Unit (CPU) 10 is provided that is a conventional microprocessor. The CPU 10 is driven by micro-instructions that are executed in a particular sequence. The micro-instructions and the sequence of execution is defined by the programmer of the system, which is achieved in a conventional manner. The CPU 10 has a data input D0-D7 that is interfaced with a data bus 12. The CPU 10 also has an address output A0-A15 that is interfaced with a sixteen-bit address bus 14. A Non-Maskable Interrupt input (NMI) is provided for receiving an external interrupt signal. A Reset Input (RST) is also provided for receiving a reset signal. A Chip Enable (CE) output is provided for generating an external memory control signal to allow the memory to be enabled. A Write Output (WR) and a Read Output (RD) are also provided for controlling the external memory.

An external memory 16 is provided which is comprised of volatile memory. The memory 16 may be comprised of Static Random Access Memory (SRAM) or Dynamic Random Access Memory (DRAM). The memory 16 has a Data Input/Output D0-D7 interfaced with data bus 12 and also an Address Input A0-A15 interfaced with the address bus 14. Memory 16 also receives a Chip Enable Input, a Write Enable Input and an Output Enable Signal. Whenever the Chip Enable Signal CE is present and the Write Enable Signal WR is present, data is written into the Data Input/Output D0-D7 in accordance with the address received on the Address Input A0-A15. Whenever the Chip Enable and Output Enable signals are present, data is accessed from the memory array within the memory 16 and output on the Data Input/Output D0-D7 to data bus 12. Therefore, the memory 16 is under the control of the CPU 10 and is utilized to store data, instructions, etc. In general, any information required to be stored by the CPU 10 that cannot be stored internal to the CPU 10 is stored in the memory 16. Most conventional CPUs 10 have internal registers and storage areas for temporarily storing data, pointers, intermediate instructions, etc. However, only limited storage can be provided internal to the CPU 10. For mass storage, external memories, such as the memory 16, are provided. Further, non-volatile memory can also be provided and interfaced with the address bus 14 and the data bus 12.

A controller 18 is provided, which controller contains an internal memory 20, which is illustrated in phantom. As will be described hereinbelow, this is a "hidden" memory and provides a storage location in which to store certain sets of instructions utilized by the CPU 10 to resume operation after a power fail situation has occurred and the CPU 10 is placed into a Power Up sequence. The controller 18 is generally operable to detect a power fail situation prior to the power level decreasing below acceptable tolerances for the CPU 10 and the memory 16. The CPU 10 has a specified operating range, below which it will not reliably execute instructions. In addition, the memory 16 also has an operating voltage range over which it will allow data to be written to the internal memory array, or allow data to be read from the internal memory array. However, the memory 16 also has a further minimum voltage, which is typically lower than that for reading and writing data in the memory, that will allow data to be maintained in the memory. As will be described hereinbelow, this voltage level maintains the integrity of data in the memory in a Write Protect situation. Such systems are described as battery backed-up memory systems, one example of which is illustrated in U.S. Pat. No. 4,645,943, issued to Smith, Jr., et al on Feb. 24, 1987.

In operation, the controller 18 detects a power fail situation at an early stage via a user definable threshold input. Upon detection of the early power fail, a Non-Maskable Interrupt (NMI) signal is generated. A Reset (RST) is produced when the power supply decays to an out-of-tolerance condition, which is also user definable. The time period between generation of the Non-Maskable Interrupt and the Reset is utilized by CPU 10 to store critical information held in registers, counters, pointers, etc. into the memory 20. As will be described hereinbelow, this memory 20 resides transparent to the operating system memory map and is invoked at the user's discretion by predetermined input codes programmed into the instruction sequence of the CPU 10.

During an ensuing power-up sequence of the CPU 10, the Reset output of controller 18 is held active for a sufficient time for the CPU 10 to stabilize, at which point the reset operation is terminated. The critical information stored in the memory 20 can then be retrieved under the control of the CPU 10 and processing begun at the point in the instruction sequence that existed previous to the power fail detection. Once information from the hidden memory 20 is recovered, the hidden memory 20 is exited and the normal power valid operation is resumed.

The Non-Maskable Interrupt (NMI) output is utilized to warn the CPU 10 of an impending power failure. An internal precision comparator monitors a Threshold Voltage Input (TV$_i$) relative to an accurate voltage reference. Once the TV$_i$ pin falls below this reference voltage, the Non-Maskable Interrupt is forced active for a time period $t_{nmi}$. The Threshold Voltage Input can be derived from the V$_{cc}$ supply of approximately +5 volts or from a higher D.C. voltage upstream of the supply. Since the comparator threshold voltage is user programmable per internal control registers in the controller 18, the TV$_i$ input can be tied directly to the +V$_{cc}$ supply if no higher voltage supply is available or is not needed. If the higher voltage D.C. level is chosen for early power fail detection, a simple resistor divider network can be utilized to set the voltage input to the desired threshold. An internal reference voltage is set to 2.58 volts and, therefore, the value of the resistors in the resistor divider is derived by selecting the values of the resistors such that when the voltage TV$_i$ is at the desired detect threshold, the voltage input to the TV$_i$ input is approximately equal to 2.58 volts. Both an active high NMI output and an active low NMI output are made available to the user.

The reset output (RST) is output whenever the supply voltage V$_{cc}$ decays to an out of tolerance condition. A separate precision comparator is provided that monitors the supply at the V$_{cc}$ pin relative to an internal reset voltage level V$_{res}$. During power down, the Reset output (RST) is forced active as the V$_{cc}$ supply decays below V$_{res}$, the RST output is held active as the supply continues to decay. Both an active high RST and an active low RST are made available to the user. The active high output will slew down with the supply. During power up, the reset outputs will be held active for time $t_{res}$, after V$_{cc}$ rises above V$_{res}$. The level of V$_{res}$ is user programmable at thresholds of 4.50 and 4.30 volts.

An internal watchdog function is provided in the controller 18 to monitor processor execution during a power valid operation. The reset outputs will be forced active if the watchdog does not receive a stimulus for time $t_{tp}$ of a high-to-low transition at the Watchdog Strobe Input (WD). This transition must occur during time $t_{tp}$ or the reset outputs will be forced active for $t_{res}$. The watchdog timer can also be reset under software control by executing a successful entry to the hidden memory 20 followed by an exit from the hidden memory 20. If this entry and exit is completed before time $T_{tp}$, the timer will be reset and the outputs will not be forced active. The time-out period $T_{tp}$ is user programmable to 125 MS, 500 MS, 2 sec. or infinity (i.e., disabled). The default condition maintains a disabled watchdog monitor. The interrupt output from the watchdog timer can be changed at user discretion to be output on the NMI output instead of the default condition of the RST output.

The volatile memory 16 is made non-volatile by utilizing an external battery 22 that is connected to the $V_{bat}$ input of controller 18. The controller 18 monitors the voltage level at the $V_{cc}$ input, which is approximately +5 volts. As this voltage input decays during a power failure, the conditioned Chip Enable Pin ($CE_{con}$) is forced inactive high independent of the memory access Chip Enable Input (CE), which was received from the CPU 10. This activity unconditionally Write protects the volatile memory 16 as $V_{cc}$ falls to $V_{res}$. If a valid access is in process during power fail detection, that memory cycle will continue to completion before the memory is Write protected. If the memory cycle is not terminated, the $CE_{con}$ output will unconditionally Write protect the memory within fourteen to forty-two microseconds. The voltage level defined as out-of-tolerance is the same level as set for the reset output $V_{res}$. As the supply continues to decay from $V_{res}$, an internal switching device forces V out and $CE_{con}$ to the voltage of the external battery 22. The external battery 22 is typically a three volt lithium cell. During power up, $V_{out}$ and $CE_{con}$ are switched back to the plus supply voltage level as $V_{cc}$ rises above the battery potential. The output $CE_{con}$ is held inactive for approximately 50 ms after the supply has reached $V_{res}$, this operation being independent of the CE input to allow for processor stabilization. During normal operation with $V_{cc}$ at its normal voltage level, the CE input is passed through to the $CE_{con}$ pin on controller 18 with a propagation delay of 7 ns. If non-volatility is not required in the memory 16, the $V_{out}$ and $CE_{con}$ outputs are disabled through internal instructions.

Figure 2:
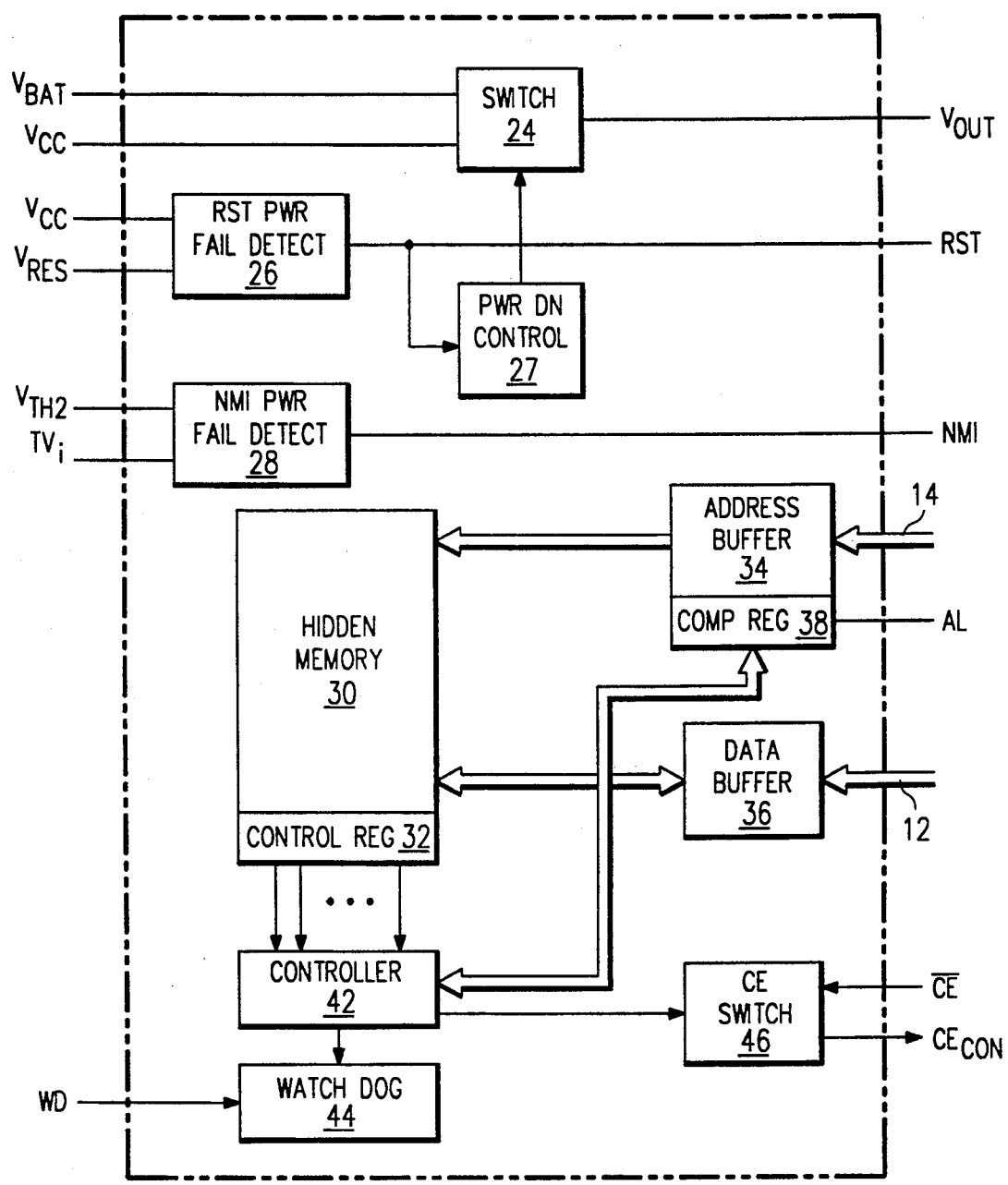
FIG. 2 illustrates a block diagram of the controller.

Referring now to FIG. 2, there is illustrated a block diagram for the controller 18. The $V_{bat}$ input is connected to one-side of a two input switch 24, the other input of which is connected to the $V_{cc}$ supply voltage input. The switch 24 provides the $V_{out}$ output, which is connected to the memory 16 for the purposes of providing a back-up power supply. A power fail detect circuit 26 is provided for controlling the generation of the RST signal. The power fail detect circuit 26 receives at one input the voltage $V_{cc}$, and at another input the threshold voltage $V_{res}$. As described above, the threshold voltage $V_{res}$ is user programmable at thresholds of 4.50 and 4.30 volts. The output of the power fail detect circuit 26 is also input to a power down control circuit 27 which controls the switch 24. As described above, the switch 24 is utilized to make the volatile memory 16 non-volatile.

An NMI power fail detect circuit 28 is provided for generating the NMI output. A threshold voltage $V_{th2}$, which constitutes the 2.58 volt threshold, is input on one input to the power fail detect circuit 28. The other input is the $TV_i$ input. As described above, the power fail detect circuit 28 operates to warn the CPU 10 of an impending power failure. It contains an internal precision comparator that monitors the threshold voltage $TV_i$ relative to the threshold voltage $V_{th2}$.

The memory 20 is comprised of a hidden memory array 30 which includes static random access memory and a plurality of control registers 32 for storing control bits to control the operation of the controller 18. The memory array 30 is generally comprised of 2,040 bytes of user programmable non-volatile static RAM. This memory resides transparent, or hidden, from the normal operation system memory map. As will be described hereinbelow, this memory is inserted into the address space of the CPU 10. This operation is invoked by the CPU 10 issuing three consecutive Read cycles to a user definable address location in the system I/O map, which address location is occupied by the address of the hidden memory array 30. In a similar manner, data is contained in the data buffer 36 and is interfaced with the data bus 12. As address inputs A0-A15 are held valid, a high-to-low transition on an address latch input AL will latch the 16-bit address location into a compare register 38 independent of the Chip Enable signal (CE). The compare register 38 compares the received address with an internally generated value. If three consecutive matches are made, ensuing memory access cycles will be directed to the hidden memory array 30 if the addresses correspond to the portion of the address space of CPU 10 occupied by the hidden memory 30. In the preferred embodiment, the address space for the CPU 10 is 65,536 bytes. The memory 30 can occupy either the lower 2,048 bytes of the memory space or the upper 2,048 bytes of the memory space, as will be described hereinbelow. The control register 32 is interfaced with a controller 42, which is interfaced with both a watchdog timer 44 and a Chip Enable Switch 46. The controller 42 also is interfaced with the compare register 48. The controller 42 is operable to control the internal operation of the controller 18.

Once the hidden memory 30 has been accessed, the external memory map for the corresponding 2,048 byte locations in the memory 16 will be disabled by an unconditional, inactive state of the $CE_{con}$ output. Standard SRAM access control will now be available in the hidden memory 30 utilizing the address inputs A0-A15 and the 2,040 bytes from an address of 0000 to 07F7, for the hidden memory 30 occupying the lower portion of the address space. For simplicity purposes, all address to the hidden memory will be described assuming the lower portion of the address space is occupied by hidden memory 30.

Any memory map location that falls outside the address space occupied by the hidden memory 30 is automatically routed to the memory 16. Once the hidden memory array 30 is invoked, it is the address received from the CPU 10 that determines whether the hidden memory array 30 is accessed or the memory 16 is accessed. This is all done transparent to the CPU 10, although the CPU 10 must initially determine whether the memory space of the hidden memory 30 is inserted into the memory space. As described above, the 2,048 byte hidden memory array 30 will also be available at the upper portion of the memory map from address F800 to FFFF. The upper eight bytes of the 2,048 byte section comprise the storage area for the control registers, and therefore, only 2,040 bytes are available for the user programmable memory space.

When the hidden memory 30 is to be removed from the address space of the CPU 10, it is necessary to input three consecutive I/O Read cycles to the same address that was utilized to invoke the hidden memory 30 into the address space of the CPU 10. A normal memory map operation will then be available for ensuing memory accesses, provided the output CE from CPU 10 has returned to an inactive state. The invoke/exit I/O location is user definable and is stored in the control registers 32. The default invoke/exit I/O location is, in the preferred embodiment, 07FF.

The hidden memory 30 is utilized to store critical settings during a power down cycle, or it can be used for any general memory map expansion, secure data field, or general data storage application. It is important to note that the integrity of the data stored in the hidden memory 30 is dependent upon the battery 22 being connected to the $V_{bat}$ terminal. During a power down condition where the memory 16 is Write protected, the hidden memory 30 is also Write protected. Any valid memory access which occurs during a power fail when $V_{cc}$ slews below $V_{res}$ will continue to completion before the hidden memory 30 is Write protected.

The control registers 32 reside at the eight uppermost address locations in the 2,048 byte memory space of the hidden memory 30; that is, memory location 07F8 through 07FF. Once the control registers 32 are configured, they will maintain valid settings in the event of power loss, provided there is a valid battery input to the $V_{bat}$, input pin. If the upper 2,048 byte section memory is chosen for the address space of the hidden memory 30, the particular ones of the control registers 32 reside at locations FFFA through FFFF. These registers provide control information for the controller 18 that can be input thereto by the CPU 10 and status information relating to the operation of the controller 18 for output to the CPU 10.

The address locations 07F8 through 07FB contain access control information. All settings of registers at address locations 07FC through 07FF will be to a default setting until the access control bytes are written to a specific pattern. Once a valid update pattern is written, new settings subsequently written into the upper four control registers will become active as the hidden memory 30 is exited. Any other combination of bits will cause the contents of the settings in the upper four bytes to be left unchanged, as the hidden memory 30 is exited, these being the current valid settings. The address locations 07FC through 07FF can be read or written at any time, but will not be changed to other than current settings unless hidden memory 30 is exited with valid update settings at addresses 07FA through 07FB. Addresses 07FA through 07FB will be cleared as the hidden memory 30 is exited so that additional updates to control registers will require that valid update settings are rewritten. These access control bytes should be written last, prior to exiting the hidden memory 30, so that the other control bytes can be read and verified, and to avoid accidental update in case of a power failure.

Addresses 07FC and 07FD contain the address location for the I/O invoke/exit of the hidden memory 30.

The byte at address 07FD contains the most significant address location bits; that is, 07FD defines the I/O address location for addresses $A_{15}$-$A_8$. Byte 07FC contains the address location for addresses $A_7$-$A_0$. These two bytes can be read or written at any time while inside the hidden memory 30, but will not be updated unless the valid update pattern is present as hidden memory 30 is exited. Any new programmed I/O address location will become valid only after the hidden memory 30 has been exited. That is, the address location utilized to invoke the hidden memory 30 must also be utilized to exit.

The address location 07FE controls the NMI threshold voltage value $V_{nmi}$, the out of tolerance voltage $V_{res}$, power fail sequencing, and the hidden memory location 30. The least significant bit, bit 0, is a user bit which can be read or written at any time while inside the cloaked memory. The status bit 3 determines the location of the 2,048 byte hidden memory 30 within the memory map of the CPU 10. If this is set to a logical "1" (default), the hidden memory 30 will reside at addresses 0000 through 07FF. If it is set to a logical "0", the hidden memory 30 address will be FA00 through FFFF. Bit three controls the automatic invoking of the hidden memory 30. If this bit is set to a logical "0", hidden memory 30 will automatically be invoked on power down when the input pin $TV_i$ falls below $V_{nmi}$. If this method of operation is chosen, and a valid access to memory is in process when power failure occurs, the hidden memory 30 will not be invoked until the user terminates the access to memory or the $V_{cc}$ supply reaches $V_{res}$. Subsequent memory cycles will be directed to hidden memory 30 only after memory access control signals, namely CE, have returned to an inactive state. The hidden memory 30 will also be invoked on subsequent power-up and must be exited for normal memory map allocation. The default condition of a logical "1" at bit three presents normal operation during power up/power down with the user invoking the hidden memory 30.

Bit four is utilized to control the sequencing of the RST and NMI outputs. If bit four is set to the default condition of a logical "1", these outputs behave as described previously. If this bit is set to a logical "0", RST will not be forced active during power down, but rather will be forced active during time $t_{res}$, as soon as $V_{cc}$ slews past $V_{res}$. This sequencing allows for non-volatile processor applications. The NMI outputs will be forced active during power down for time $t_{nmi}$, and then held inactive for subsequent power-up. When $TV_i$ slews above $V_{nmi}$, the NMI outputs will again be forced active for time $t_{nmi}$. Therefore, either the RST outputs or the NMI outputs will bring the processor out of the low power mode. If this method of sequencing is chosen, both NMI and RST will be held at a high level by the battery during power failure.

Bit five of the byte at address 07FE is utilized to define the out of tolerance condition $V_{res}$. The default condition of a logical "1" in bit "five" defines $V_{res}$ at 4.30 volts. If a logical "0" is written into this bit, $V_{res}$ will be 4.50 volts.

Bits six and seven at the 07FE register provide the two most significant bits that are utilized to define the voltage value $V_{nmi}$. When the $T_{vi}$ input falls below $V_{nmi}$, the NMI output is forced active. The default setting value for $V_{nmi}$ (2.50 volts) is intended to be utilized with an external user defined voltage divider network. The other two values are intended to detect early power fail directly from the $V_{cc}$ supply. The two additional values are 4.75 volts and 4.60 volts.

The address location 07FF contains NMI status bits, controls, watchdog timeout and outputs, and sets the condition of the $CE_{con}$ and $V_{out}$ outputs. The least significant bit, bit zero, determines the condition of the $V_{out}$ output. The default setting of the logical "1" defines $V_{out}$ as not being utilized for an external nonvolatile device. That is, the $V_{out}$ pin will not be forced high by the battery after a power failure. If an external device (processor, SRAM, etc.) is to be made nonvolatile, this bit should be set to an electrical "0". If the setting is chosen the $V_{out}$ pin will be held high by the battery as $V_{cc}$ slews below the BAT input.

Bit one of the address location 07FF is utilized to set the level of the Conditioned Chip Enable Signal $CE_{con}$ during power fail. If set to a logical "1" (default), the $CE_{con}$ output will not be held high by the battery during power fail. If the $CE_{con}$ output is to be held high (for Write protection of an SRAM designed for non-volatility) during and throughout a power fail, each bit must be set to a logical "0".

Bit two of the control byte at location 07FF is utilized for defining which outputs will be forced active when the watchdog timer is violated. If this bit is set to a logical "1", the RST output is forced active at watchdog violation, and if it is set to a logical "0", the NMI outputs will be forced active. The default condition is a logical "1".

Bits three and four of the control byte at 07FF are utilized for setting the timeout period for the watchdog monitor. The condition of "11" disables the watchdog monitor so that no input at pin WD is required for valid operation. Other timeout periods are two seconds, 500 ms and 125 ms.

The three most significant bits, bits five, six and seven are NMI status bits. These bits indicate from what condition NMI outputs are forced active. Normally, these are written to a logical "0". However, if power failure occurs and NMI outputs are forced active, a logical "1" will be written by internal timing into bit 7. The NMI outputs will also be forced active upon a subsequent power valid if the non-volatile process sequencing (bit four, byte 07FE) has been chosen for operation. When this occurs, a logical "1" will be written into bit five. If the NMI outputs are chosen as the watchdog fail bits (bit two, byte 07FF), when NMI is forced active from a watchdog failure, a logical "1" will be written into bit six. Therefore, when an NMI signal is received, the user has the ability to check in software from where that NMI output was received. If the NMI outputs are forced active from a watchdog violation and power failure is detected during the active NMI output pulse, the NMI outputs will return to the inactive state following the NMI pulse width $t_{nmi}$, and will automatically be forced active again within fifty percent of the width of $t_{nmi}$. This automatic additional active pulse is designed to interrupt the processor due to a loss of power in the event that this loss of power occurred during an active NMI condition as a result of the watchdog violation. These status bits can be read at any time and can be written to a logical "0" only, in order to reset the status state. Any attempt to Write a logical "1" to the status bits will not alter their current state. These status bits can be cleared without writing a valid update pattern. If a status bit has been reset and written to a logical "0", but another NMI condition occurs before exiting the cloaked memory, that status bit will not be cleared.

Figure 3:
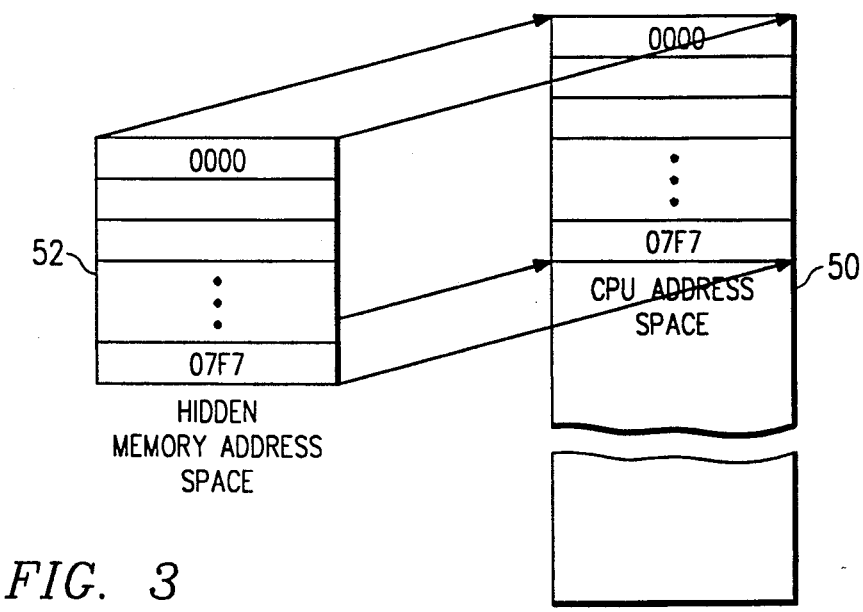
FIG. 3 illustrates a diagrammatic view of the CPU address space in the hidden memory address space.

Referring now to FIG. 3, there is illustrated a diagrammatic view of the CPU address space and the hidden memory address space. The CPU address space is generally referred to by a reference numeral 50 and the hidden memory address space is generally referred to by a reference numeral 52. As described above, the CPU address space is comprised of 65,536 bytes, with each byte occupying an address location. By comparison, the hidden memory address space 52 is comprised of 2048 bytes of memory, with each byte occupying a separate memory address location. For purposes of discussion, the hidden memory address space will occupy the addresses 0000 through 07F7. However, it should be understood that in the preferred embodiment, provision is made for the hidden memory address space 52 to alternately occupy the address space from address locations F800 to FFFF.

Whenever the hidden memory array 30 within the controller 18 is invoked, the controller 18 "captures" the memory access operation from the CPU 10. This occurs whenever an address corresponding to the hidden memory address space 52 is output by the CPU 10. In general, the CPU 10 is limited to the address space with which it can work. Since most systems utilize the full address space, or more importantly, it is desirable not to limit the amount of address space that can be utilized in normal operation, the hidden memory address space provides additional memory without requiring the CPU 10 to alter its operation. In effect, the hidden memory address space provides a virtual extension to the CPU address space 50. Once invoked, the hidden memory address space 52 virtually occupies and becomes part of the CPU address space 50. As described above, it is only necessary for the CPU instructions to output a specific invoke code, which, in the preferred embodiment is three successive addresses, to replace a portion of the CPU address space 50 with the hidden memory address space 52. The CPU 10, executes instructions in accordance with the address space limitations that are associated therewith, i.e., only 65,536 bytes can be addressed. In effect, the hidden memory address space 52 provides an additional 2048 bytes of memory for a given addressing capability of a CPU.

Although only a portion of the CPU address space 50 is replaced by the hidden memory address space 52, a greater portion or even the entire CPU address space 50 could be replaced with the hidden memory address space 52. Further, it is not necessary that the hidden memory address space 52 be disposed at the upper portion or the lower portion of the CPU address space 50, but rather, the hidden memory address space 50 could be located at any location within the CPU address space 50. Further, it is also not necessary that all of the addresses in the hidden memory address space be adjacent each other in a sequential order. They could be located at different address locations within the CPU address space. It is only important that the controller 18 recognize an address that is output by the CPU as being directed toward the hidden memory 30 when invoked, and then disable the memory 16 and enable the hidden memory 30.

Figure 4:
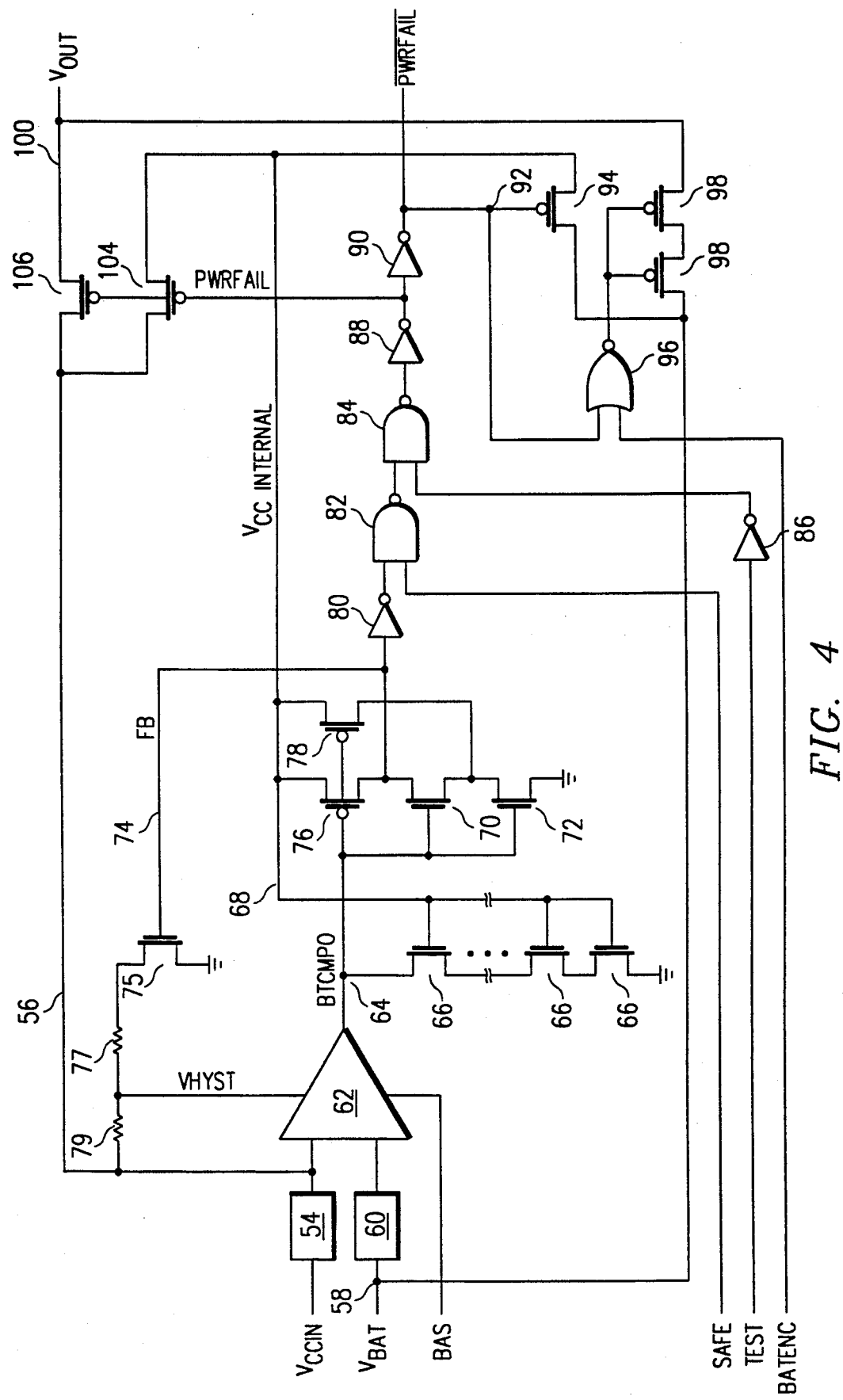
FIG. 4 illustrates a schematic diagram of the power down control circuitry.

Referring now to FIG. 4, there is illustrated a schematic diagram of the power fail detect circuitry 26 and the power down control circuitry 27 and switch 24 of FIG. 2. The input voltage VCCIN is input to an ESD protection device 54, the output of which is connected to a node 56. The battery voltage is input on the terminal BAT to a node 58, node 58 connected to the input of an ESD protection circuit 60. The output of ESD connection circuit 60 is input to one input of a comparator 62, the other input of which is connected to the node 56 for $V_{cc}$. A hysteresis input VHYST is input to comparator 62 and a current reference BAS is also input to the comparator 62. The output of ESD protection circuit 60 and VHYST are internally input to opposite sides of a differential amplifier (not shown), wherein the current reference BAS is input to the gates of a plurality of current reference circuits. The VCCIN input is input to the power node in the comparator 62. The output of the comparator is connected to a node 64. Node 64 is connected to ground through a plurality of series connected N-channel transistors 66, the gates of which are connected to an internal $V_{cc}$ node 68. Transistors 66 are operable to pull node 64 down when full $V_{cc}$ is applied to the node 68. The comparator 62 is operable to compare the value of VCCIN to the battery voltage and output a signal when the value of the supply voltage input to the controller 18 falls below the battery voltage. This indicates a power fail mode.

The output of the comparator 62 on node 64 is input to the gates of two series-connected transistors 70 and 72 with the source of transistor 72 connected to ground and the drain of transistor 70 connected to a feedback node 74. A P-channel transistor has the drain thereof connected to node 74, the source thereof connected to the node 68 and the gate thereof connected to the node 64. The second P-channel transistor 78 has the gate thereof connected to the gate of transistor 76, the source thereof connected to the source of transistor 76 and the drain thereof connected to the source of transistor 72. Node 74 is also connected to the input of an invertor 80, the output of which is connected to one input of a NAND gate 82. The other input of NAND gate 82 is connected to a control signal SAFE. The output of NAND gate 82 is input to the input of a NAND gate 84, the other input of which is connected to the output of an invertor 86, the input of which is connected to a TEST input signal. This is connected to an external terminal for diagnostic purposes. The output of NAND gate 84 is connected through an invertor 88 to an output node PWRFAIL to indicate a power fail condition. The output of invertor 88 is input through an invertor 90 to a node 92 to provide the inverse of the PWRFAIL signal.

The transistors 70, 72, 76 and 78 form a Schmidt trigger, the output of which comprises the node 74. Node 74 is connected to the gate of a transistor 75, the drain of which is connected to ground and the source of which is connected through a resistor 77 to the VHYST hysterisis input of comparator 62. The VHYST input is also connected through a resistor 79 to node 56. Transistor 75, resistor 77 and resistor 79 form a hysterisis feedback loop for the comparator 62.

The node 92 is connected to the gate of a P-channel transistor 94, one side of which is connected to the node 58 to receive the battery input and the other side of which is connected to the node 60 to provide the internal $V_{cc}$ supply voltage. In addition, the node 92 is connected to one input of an OR gate 96, the other input of which is connected to a battery enable signal BATENC. The battery enable signal BATENC comprises one bit of the control byte 07FF from the control register 32. The output of OR gate 96 is connected to the gates of two series-connected P-channel transistors 98. One side of transistor 98 is connected to the battery input on node 58 and the other side thereof is connected to a $V_{out}$ node 100, which is connected to the $V_{out}$ terminal. The transistors 98 comprise the battery switch for connecting the battery to the memory 16.

The output of invertor 88 and the signal PWRFAIL are input to the gates of a P-channel transistor 104 and a P-channel transistor 106. One side of the transistors 104 and 106 are connected together to node 156 to receive the input supply voltage, with the other side of transistor 104 being connected to the node 68 to provide internal $V_{cc}$ and the other side of transistor 106 connected to the node 100 to provide $V_{cc}$ to the $V_{out}$ terminal. Therefore, when a power fail condition is present, both the internal $V_{cc}$ node 68 and the $V_{out}$ terminal on node 100 are disconnected from the external power supply and the battery is then connected to both the node 100 and the node 68. However, the BATTENC signal can be generated by the appropriate word stored in the control registers to disable the battery back-up system.

Figure 5:
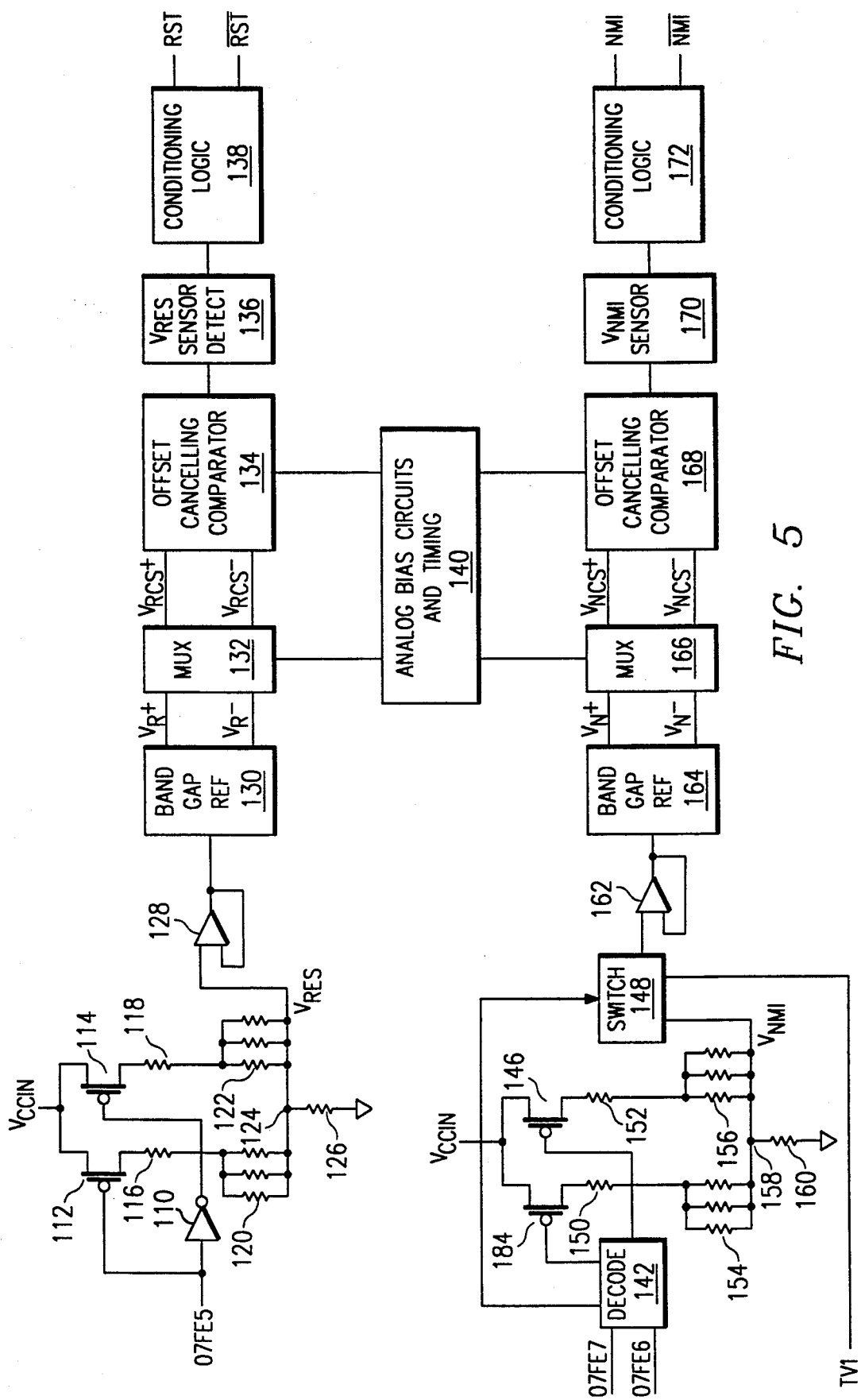
FIG. 5 illustrates a block diagram of the power fail detect circuitry for both the RST signal and the NMI signal.

Referring now to FIG. 5, there is illustrated a block diagram of the power fail detect circuitry for both the RST signal and the NMI signal. The control bit 07FE5, which is the fifth bit of the control word 07FE, is input to one input of an invertor 110 and also to the gate of a P-channel transistor 112. The output of invertor 110 is input to the gate of a P-channel transistor 114, transistors 112 and 114 having the one side thereof connected to the voltage $V_{CCIN}$, and transistor 112 having the other side thereof connected to a resistor 116, and transistor 114 having the other side thereof connected to a resistor 118. Resistor 116 has the other side thereof connected to one side of a plurality of parallel-connected resistors 120 and, similarly, resistor 118 has the other side thereof connected to a plurality of resistors 122. The other side of resistors 120 and 122 are connected to a node 124, which node 124 is connected to ground through a resistor 126. The resistors 116 and 118 are variable and resistors 120 and 122 are selectable through fuse connections (not shown). Resistor 126 is also an adjustable resistor. These adjustments are made during manufacturing.

The circuitry comprised of transistors 112 and 114 and the associated resistors provides a Digital-to-Analog Converter (DAC). The logic state of the input bit 07FE5 determines which of two voltages is selected. This provides the reference voltage $V_{res}$ on the output of node 124. As described above, $V_{res}$ corresponds to two thresholds 4.50 volts and 4.30 volts. These are selectable by varying the control word in the control register 32.

The output of the DAC on node 124 is connected through a unity gain amplifier 128 to a Band Gap Reference circuit 130, which is conventionally known and which generates two reference voltages $V_{R+}$ and $V_{R-}$. These are input to a chopper stabilizing multiplexer 132 to generate the chopper stabilized voltages $V_{RCS+}$ and $V_{RCS-}$. These two voltages are input to an Offset Canceling Comparator 134. The Offset Canceling Comparator 134 is operable to provide an offset canceling effect of the chopper stabilized operation. This is a conventional circuit in the industry. The output of the Offset Canceling Comparator 134 is input to a sensor/detect circuit 136 to detect the state of the Offset Canceling Comparator 134. This is then processed through a conditioning logic circuit 138 to generate both the true and complement versions of the RST signal. The timing and bias circuits are provided in a block 140 to provide both the clock and timing circuitry for the chopper stabilizing operation in the multiplexer 132, and also the bias circuits for the comparator 134.

The sixth and seventh bits of the 07FE byte, 07FE7 and 07FE6, are input to a decoder 142. This is a two-bit decoder that essentially provides three outputs. Two outputs are input to the gates of P-channel transistors 144 and 146, respectively, and the other output is input to a switch 148, switch 148 determining whether an input reference is selected or the $TV_i$ external input is selected from the threshold when generating the NMI signals, as will be described hereinbelow. One side of transistors 144 and 146 is connected to the $V_{ccin}$ voltage and the other sides thereof are connected to a resistor 150 and a resistor 152, respectively. The other side of resistor 150 is connected to a plurality of parallel-connected resistors 154 and the other side of resistor 152 is connected to one-side of a plurality of parallel connected resistors 156. The other side of each of the plurality of resistors 154 and 156 is connected to a node 158, node 158 connected to ground through a resistor 160. Node 158 provides the $V_{NMI}$ reference voltage that is generated internally. As the transistors 144 and 146 select a voltage from the resistor combination of resistors 150, 154 and 160 or the resistors 152, 156 and 160, thereby providing two reference voltage values for the voltage $V_{NMI}$.

The switch 148 is operable to select between either the output of the DAC of the $TV_i$ external input. This is input to a unity gain amplifier 162, the output of which is connected to the input of a Band Gap Reference circuit 164, similar to Band Gap Reference circuit 130. The output of Band Gap Reference circuit 164 is comprised of two voltages, $V_{N+}$ and $V_{N-}$. These two voltages are input to a chopper stabilizing multiplexer circuit 166, the output of which is comprised of two voltages, $V_{NCS+}$ and $V_{NCS-}$. These are input to an offset canceling comparator 168 similar to the comparator 134. The output of comparator 168 is input to a $V_{NMI}$ sensor 170, the output of which is connected to a conditioning logic circuit 172 to provide the output NMI and the complement thereof. Conditioning logic circuit 172 is similar to the conditioning logic circuit 138 in that it provides timing and reset operations. In addition, the timing circuit 140 is connected to both the multiplexer 166 and the comparator 168 to provide the timing control signals therefore.

Figure 6:
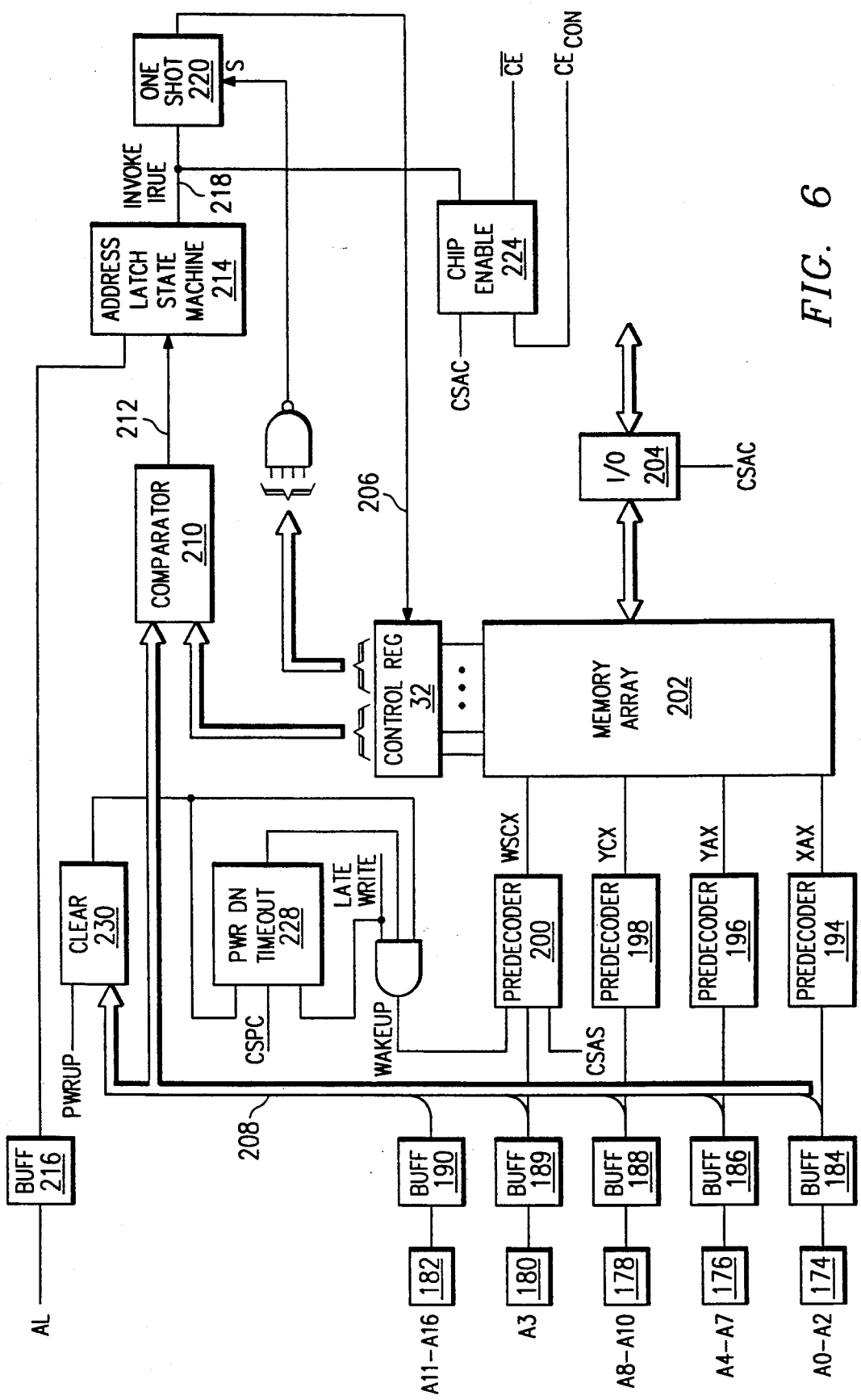
FIG. 6 illustrates a block diagram of the memory array and control register of FIG. 2.

Referring now to FIG. 6, there is illustrated a block diagram of the memory array 30 and control register 32 of FIG. 2. The addresses are received on the address inputs A0-A16. The addresses A0-A2 are input on one set of terminals 174 that provide two functions. They select a word line in the RAM and they also provide part of the invoke address. The Y-address group is comprised of the addresses A4-A7 in a group of terminals 176 and the addresses A8-A10 in a group of terminals 178. The Y-address group provides the addresses to select the bit lines of the RAM, and also the remainder of the invoke address. The address A3 on terminal 180 comprises the MSB of the Y-address. It both provides selection of the bit line in the memory, a bit of the invoke address, and also it is utilized to control the automatic power down function. The remaining address inputs A11-A16 are connected to a group of terminals 182 and are utilized primarily to generate the invoke address.

Addresses on terminal 174 are input to an address buffer 184, addresses on terminal 176 are input to buffers 186, addresses on terminal 178 are connected to buffers 188, the address on terminal 180 is connected to a buffer 189, and the addresses on terminals 182 are connected to buffers 190. The buffers 184-189 are latched to TTL buffers that convert the signals from a TTL state to a CMOS state, and buffers 190 are non-latched TTL buffers that convert the signal to a CMOS level.

The output of each of the buffers 184-189 is input to a separate set of predecoders 194, 196, 198 and 200, respectively. Buffer 184 is input to predecoders 194, resulting in an eight line output labelled XAX. The buffers 186 are input to the predecoder 196 to result in a sixteen line output labelled YAX. The buffers 188 are input to predecoders 198 to output six lines labelled YCX. The buffer 189 is input to the predecoder 200 to output two lines labelled WSCX. As will be described hereinbelow, the predecoder 200 is operable to provide a controller 18.

The output of each of the predecoders 194-200 has the decode lines output to a memory array 202 of static random access memory cells. In the preferred embodiment, the memory array 202 is one hundred twenty-eight cells wide and one hundred twenty-eight cells deep. The output of the memory array is interfaced with a data input/output circuit 204. In addition, sixty-four of the cells in the memory array 202 are interfaced with the control register 32 and the information latched into the control register through a line 206.

The output of each of the buffers 184-190 is also input to an address bus 208, which is input to a sixteen input Exclusive OR gate comparator 210. The second input of the comparator 210 is interfaced with an invoke address output by the control register 32 as a sixteen-bit address. Therefore, the sixteen-bit address on bus 208 and the sixteen-bit invoke address stored in control register 32 are compared in the comparator 210 and the matched output provided on a line 212. This is input to an address latch state machine 214 to determine if the match has been detected on three successive edges of the address latch (AL) signal which is buffered through a buffer 216 and input to the address latch state machine 214. If this occurs, an Invoke True signal is output in a line 218 to a one-shot 220. The output of the one-shot is the Latch line 206 that is input to the control register 32 and is operable to latch the contents of the control register 32.

In addition to latching the contents of control register 32, the output of the address latch state machine 214 is also input to a Chip Enable decoder circuit 224. The Chip Enable decoder circuit 224 is operable to generate an internal Chip Enable signal (CSAC) in response to receiving the Invoke True signal from line 218, but also in response to receiving the external Chip Enable signal. The Chip Enable decoder circuit 224 is also operable to generate the $CE_{CON}$ output, which relays the Chip Enable signal received from the CPU 10 to the memory 16. The Chip Enable decoder circuit 224 is similar to the Chip Enable switch 46 in FIG. 2. It is operable to generate either the external Chip Enable signal $CE_{CON}$ or the internal Chip Enable signal CSAC. When the internal Chip Enable signal CSAC is generated, it provides the necessary input signals to activate the memory address decoder section 204.

The predecoder 200 is operable to receive the internal Chip Enable signal CSAC and also a Wakeup from the output of an AND gate 226. The AND gate 226 receives a Late Write signal on one input thereof, the output of a power down timeout circuit 228, and the output of an Address Transition Detector 230. The clear circuit 230 is operable to receive both the power up signal PWRUP and the address input. This basically provides a reset whenever address activity is present in order to determine the amount of time before the PWRUP signal occurs. If an address has not occurred for a predetermined amount of time, then the timeout circuit 220 provides a timeout signal which shuts the system down. In addition, a Late Write operation reactivates the system, even if address activity is not present.

Figure 7:
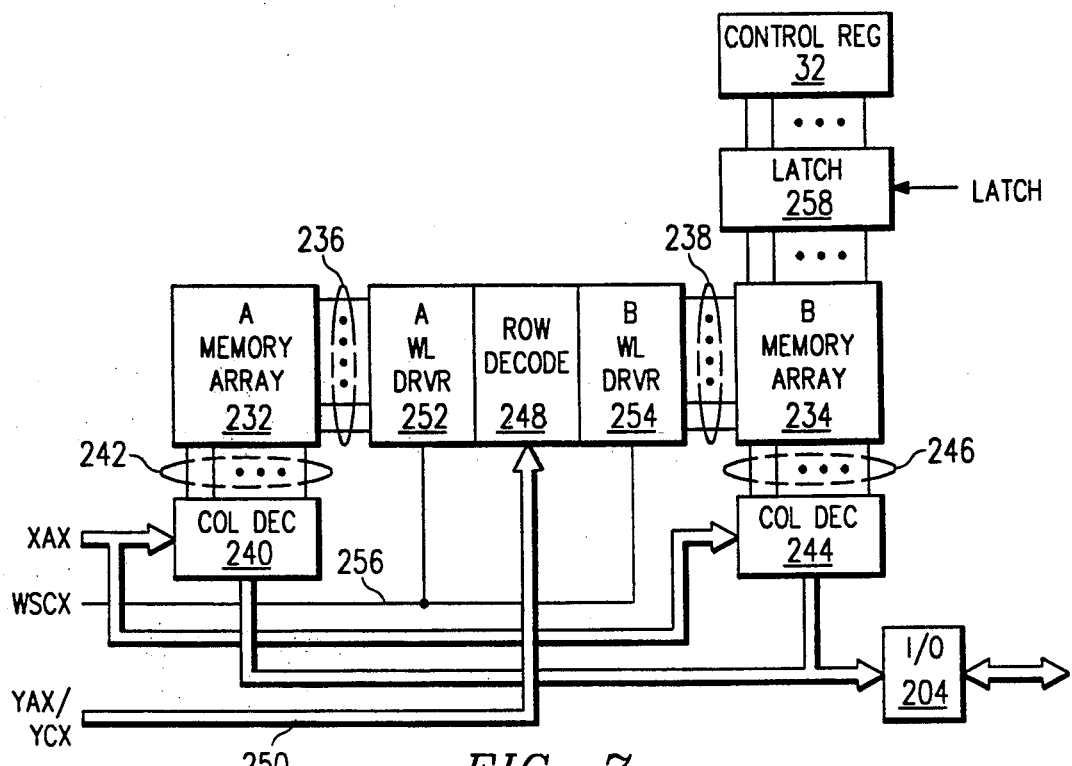
FIG. 7 illustrates a detailed diagram of the memory array.

Referring now to FIG. 7, there is illustrated a detailed diagram of the memory array 202. The memory array is comprised of an A-array 232 and a B-array 234. Each of the arrays 232 and 234 are identical to each other and are sixty-four bits wide by one hundred twenty-eight bits deep. There are one hundred twenty-eight rows controlled by word lines 236 that drive the A-array 232 and word lines 238 that drive the B-array 234. A column decoder 240 is connected to bit lines 242 from A-array 232 and a column decoder 244 is connected to bit lines 246 from B-array 234. A row decoder 248 is provided that is interfaced with the YAX and YCX predecoded signals on a bus 250, and is operable to decode the signals and output them to both an A-word line driver 252 to drive the word lines 236 and a B-word line driver 254 to drive the word lines 238. The two-bit input WSCX from predecoder 200 is input on a two line bus 256 to each of the word line drivers 252 and 254 to select only one of the A-array 232 or the B-array 234, by selecting the associated word line driver 252 or 254, respectively.

The output of each of the column decoders 240 and 244 is input to the I/O circuit 204 which contains a sense amp for reading data therefrom and drivers for receiving data from the data I/O pins D0-D7.

A latch 258 is provided that is connected between the control register 32 and the top sixty-four bits of the B-array 234. The latch 258 is operable to latch select ones of the contents of the top sixty-four bits of the B-array 234 to the control register 32 in response to the Latch signal received on line 206.

Figure 8:
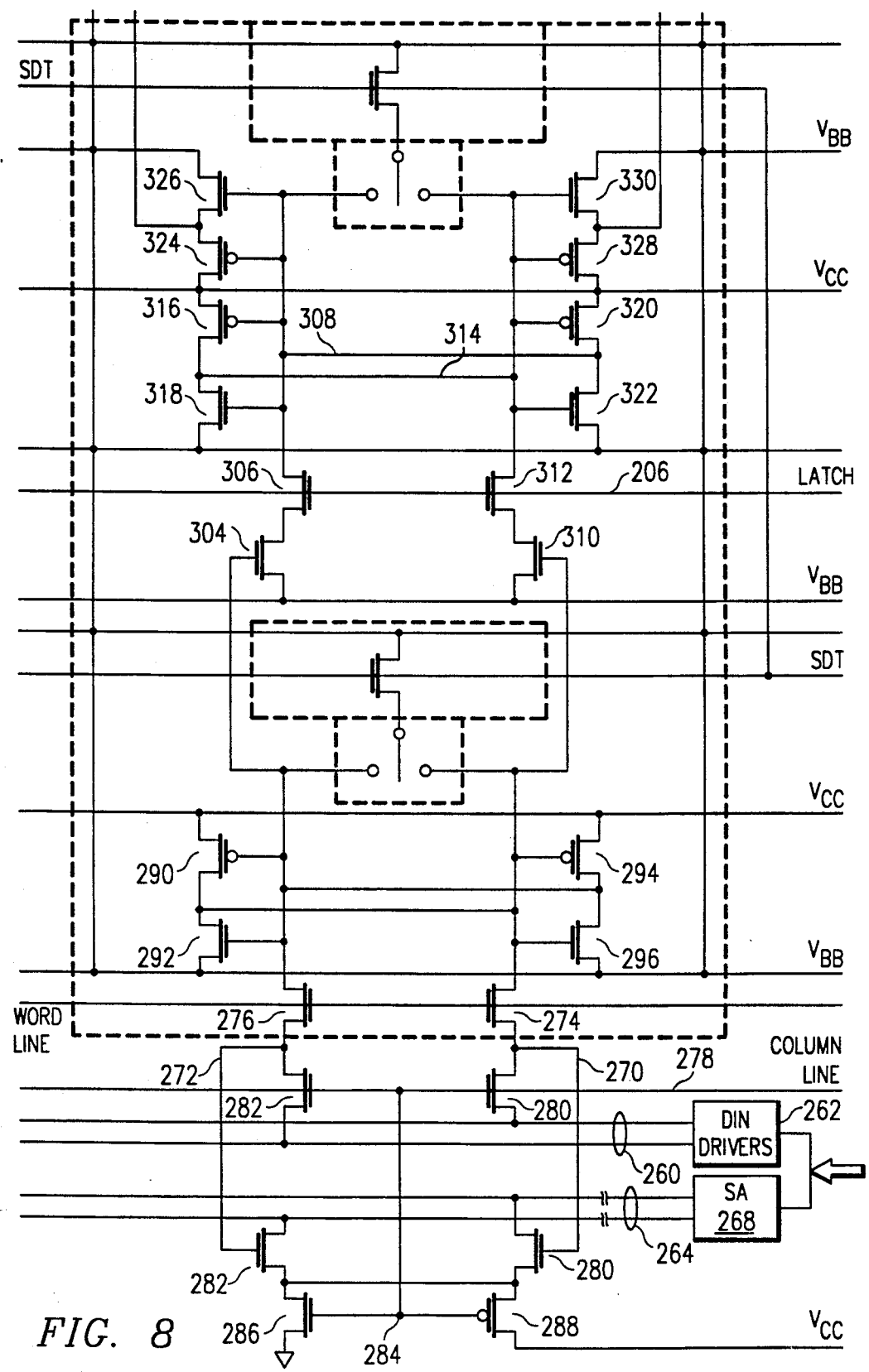
FIG. 8 illustrates a schematic diagram of one of the static memory cells.

Referring now to FIG. 8, there is illustrated a schematic diagram of one of the static memory cells, the associated latch bit in latch 258 and the associated bit of the control register 32. A set of input lines 260 are driven by data-in drivers 262 and output lines 264 are input to a sense amp 268. These are then output to the respective data I/O pins. Each of the memory cells is interfaced with bit lines 270 and 272. Lines 270 and 272 are interfaced with the lines 260 through transistors 274 and 276, respectively, such that each of the lines 270 and 272 are connected to opposite ones of the lines 260 to provide the true and a complement of the data input. The gates of transistors 274 and 276 are connected to a column line 278, which is the output of the column decoder 244. Additionally, each of the lines 270 and 272 drive the gates of transistors 280 and 282, respectively. Transistors 280 and 282 are connected on one side thereof to one of the respective lines 264 and on the other side thereof to a node 284. Node 284 is connected to the drain of an N-channel transistor 286 and also to the source of the P-channel transistor 288. The drain of P-channel transistor 288 is connected to the supply voltage $V_{cc}$ and the gates of both transistors 286 and 288 are connected to the column line 278.

Each of the memory cells is comprised of cross-coupled latched pairs of transistors with one-half of the latch comprising P-channel transistor 290 and an N-channel transistor 292, connected in an invertor configuration between the supply voltage and $V_{SS}$. The other half of the cross-coupled latch is comprised of a P-channel transistor 294 and an N-channel transistor 296, configured as an invertor. The gates of transistors 294 and 296 are connected to the source/drain connection of transistors 290 and 292 and the gates of transistors 290 and 292 are connected to the source/drain connection of transistors 294 and 296. The gates of transistors 294 and 296 comprise the sense node, which is connected through a gating transistor 300 to bit line 270. In a similar manner, the gates of transistors 290 and 292 comprise a second sense node, which is connected through a gating transistor 302 to the other bit line 272. The gates of transistors 300 and 302 are connected to the word line for the associated memory cell.

The memory cell described above is a conventional SRAM memory cell. However, in addition, a latch is provided. The gates of transistors 290 and 292 are connected to the gate of an N-channel transistor 304, the source of which is connected to $V_{SS}$ and the drain of which is connected through a latch transistor 306 to a latch node 308. In a similar manner, the gates of transistors 294 and 296 are connected to the gate of an N-channel transistor 310, which has the source thereof connected to $V_{SS}$ and the drain thereof connected through a gating transistor 312 to a sense node 314. Latch transistors 306 and 312 have the gates thereof connected to the Latch signal on the line 207.

The latch node 308 is connected to the gates of the P-channel transistor 316 and an N-channel transistor 318, the drain of transistor 316 is connected to the source of transistor 318. The source of transistor 318 is connected to $V_{SS}$ and the drain of transistor 316 is connected to $V_{CC}$. In a similar manner, the sense node 314 is connected to the gates of the P-channel transistor 320 and an N-channel transistor 322, the drain of transistor 320 connected to the source of transistor 322. The source of the drain of transistor 322 is connected to $V_{SS}$ and the source of transistor 320 is connected to $V_{cc}$. Node 308 is connected to the source/drain connection of transistors 320 and 322, and the node 314 is connected to the source/drain connection of transistors 316 and 318.

The latch node 308 is also connected to the gates of a P-channel transistor 324 and an N-channel transistor 326. Latch node 314 is also connected to the gates of a P-channel transistor 328 and an N-channel transistor 330. Transistor 324 has the drain thereof connected to the source of transistor 326 with the drain of transistor 328 also connected to the source of transistor 330. The sources of transistor 324-328 are connected to $V_{CC}$ and the drain of transistors 326-330 are connected to $V_{SS}$.

Figure 9:
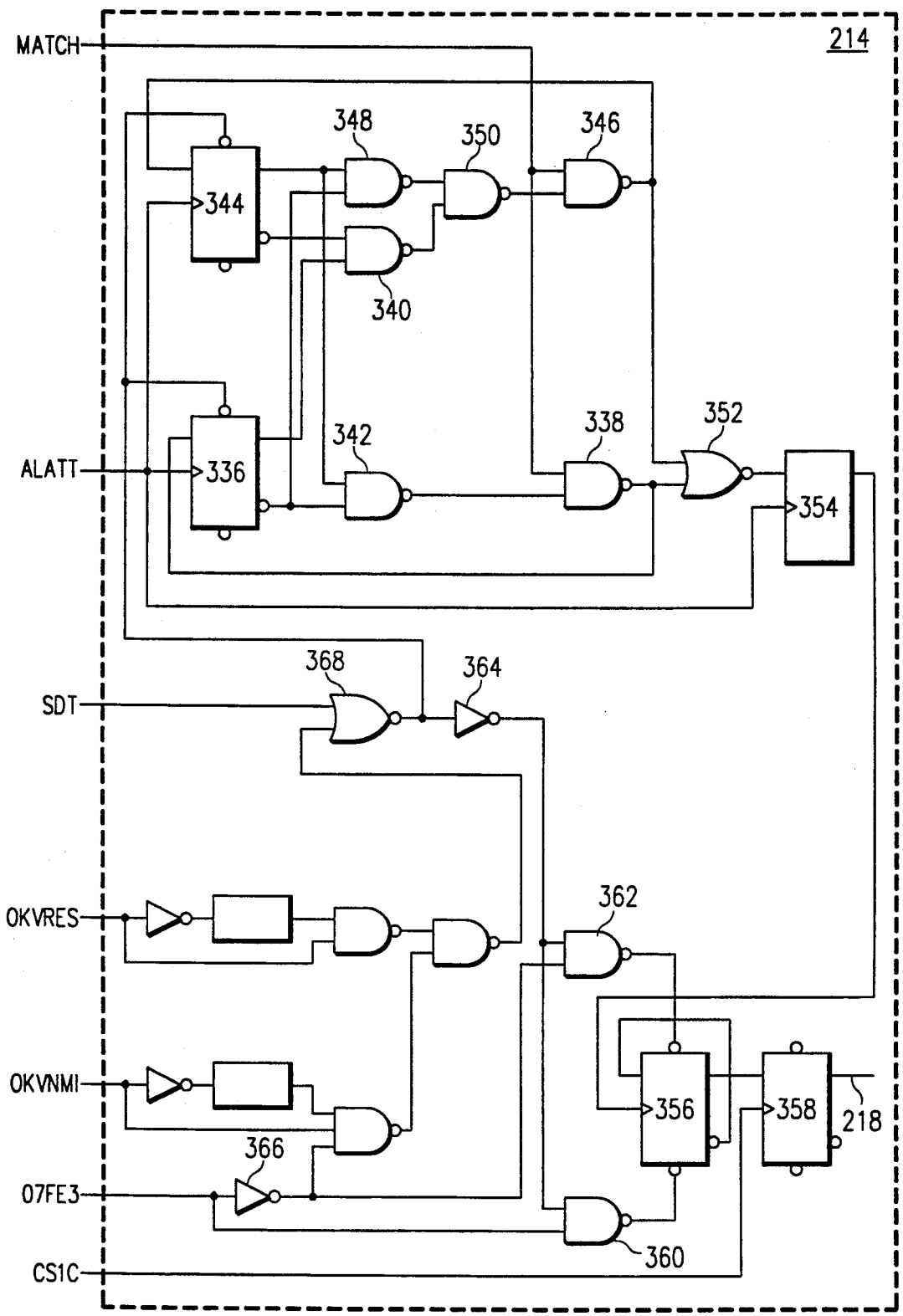
FIG. 9 illustrates a logic diagram of the address latch state machine.

Referring now to FIG. 9, there is illustrated a logic diagram of the address latch state machine 214. The address latch signal is internally conditioned to provide a signal ALATT, which is input to the clock input of a D-type flip flop 336. The data input thereto is connected to the output of a NAND gate 338 and the Q-output thereof is connected to one input of a NAND gate 340 and the Q-bar output is connected to one input of a NAND gate 342. A second D-type flip flop 344 has the data input thereof connected to the output of a NAND gate 346, a clock input connected to the ALATT signal, the Q-output connected to one input of a NAND gate 348 and the Q-bar output connected to the other input of the NAND gate 340. Additionally, the Q-output of flip flop 344 is connected to the other input of NAND gate 344 and the Q-bar output of flip flop 336 is connected to the other input of NAND gate 348. The outputs of NAND gates 340 and 348 are connected to the two inputs of a NAND gate 350, the output of which is connected to one input of the NAND gate 346. The other input of NAND gate 346 is connected to the match input on the comparator 210. The output of NAND gate 346 is connected to one input of a NOR gate 352, the other input of which is connected to the output of NAND gate 338. NAND gate 338 has one input thereof connected to the output of NAND gate 342 and the other input thereof connected to the Match Signal input. The output of NOR gate 352 is connected to the D-input of the flip flop 354. The clock input of flip flop 354 is connected to the ALATT input and the Q-output thereof is connected to the clock input of a flip flop 356. Flip flop 356 has the data input thereof connected to the Q-bar output thereof and the Q output thereof connected to the input of a toggle flip flop 358, which also received as one input thereof the CS1C input, which is a chip select input. The output of toggle flip flop 358 comprises the Invoke True output on line 218.

The flip flop 356 has the set input thereof connected with the output of a NAND gate 360 and the reset input thereof connected to the output of a NAND gate 362. NAND gate 360 has one input thereof connected to the control register bit 07FE3 and the other input thereof connected to the output of an invertor 364, and also to the other input of the NAND gate and to one input of the NAND gate 362. The other input of NAND gate 362 is connected through an invertor 366 to the 07FE3 bit of the control register 32. The invertor 364 has the input thereof connected to the output of a NOR gate 368, the output thereof also providing the reset inputs for flip flops 334 and 336. One input of the NOR gate 368 is connected to the SDT signal and the other input thereof is connected to logic circuitry that receives as its input the OKVRES signal and OKNMI signal, which are outputs of the V$_{RES}$ sense detect circuit 136 and the V$_{NMI}$ sense detect circuit 137.

Figure 10:
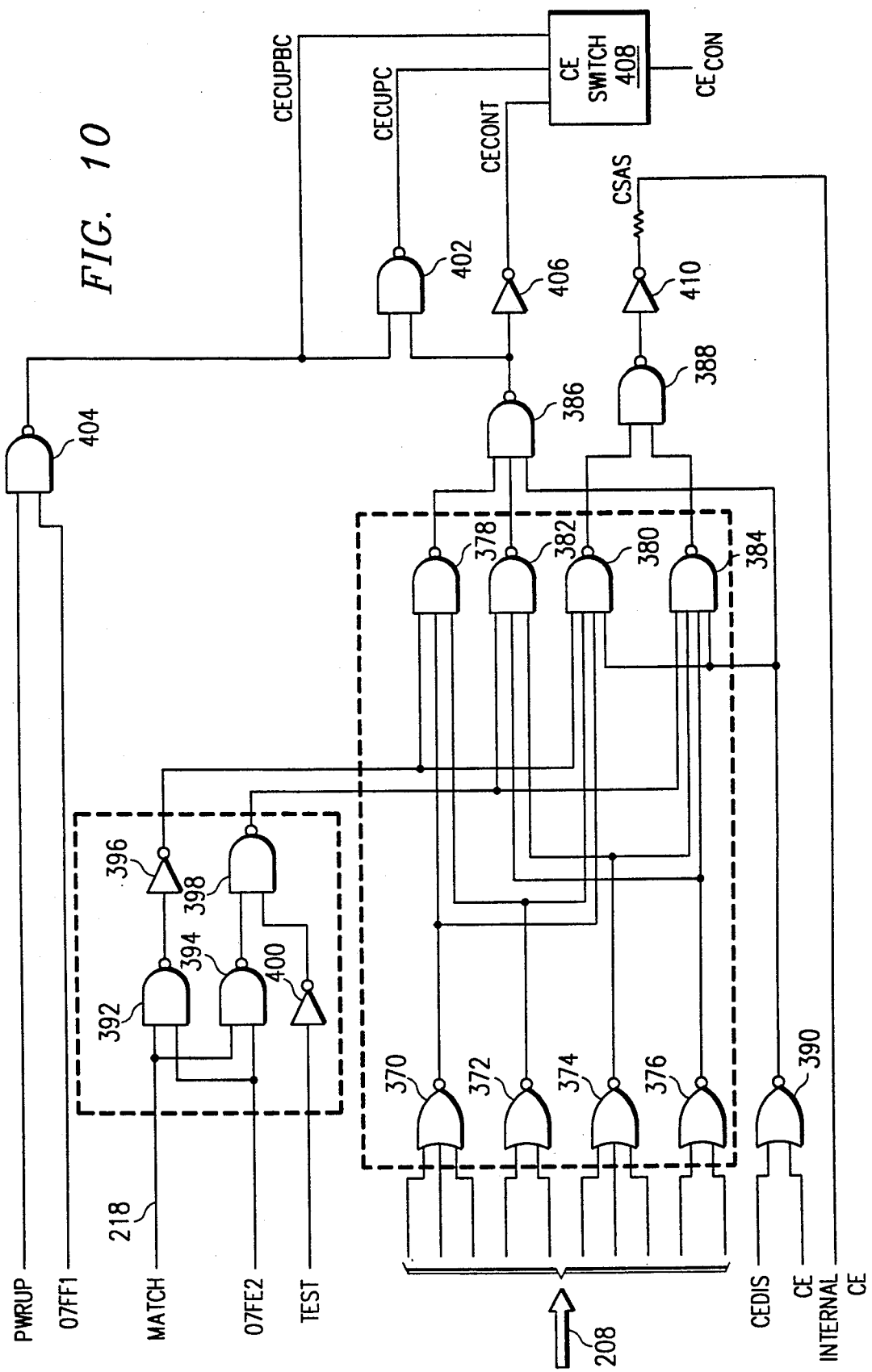
FIG. 10 illustrates a logic diagram for the Chip Enable decoder.

Referring now to FIG. 10, there is illustrated a logic diagram for the Chip Enable decoder 224 of FIG. 6. Select ones of the address bits are received from the address bus 208 on the input of NOR gates 370, 372, 374 and 376. Gate 370 receives three address inputs and the output thereof is connected to one input of a three-input NAND gate 378 and also to one input of a four-input NAND gate 380. The NOR gate 373 receives two address inputs and has the output thereof connected to one input of the gate 378 and one input of the gate 380. The NOR gate 374 has three inputs thereof connected to the address bus 208 and the output thereof connected to one input of a three-input NAND gate 382 and one input of a four-input NAND gate 384. The NOR gate 376 has two inputs thereof connected to the address bus 208 and the output thereof connected to one input of gate 382 and one input of gate 384. The outputs of NAND gates 378 and 382 are connected to two inputs, respectively, of a three-output NAND gate 386. The outputs of the gates 384 are connected to two inputs of a two-input NAND gate 388. The Chip Enable signal to the controller is input to one input of a NOR gate 390, the other input of which is connected to a Chip Enable disable signal CEDIS. The output of gate 390 is connected to one input of gate 384 and one input of gate 380.

The Invoke True input on line 218 is connected to one input of a NAND gate 392 and one input of a NAND gate 394. The other input of NAND gate 392 is connected to the complement of the 07FE2 bit and the other input of gate 394 is connected to the true form of the 07FE2 bit. The output of NAND gate 392 is connected to an invertor 396 to one input of gate 378 and one input of gate 380. The output of gate 394 is connected to one input of a NAND gate 398, the other input of gate 398 is connected through an invertor 400 to a TEST signal. The output of gate 398 is connected to one input of gate 382 and one input of gate 384. The gates 378-384, in association with the gates 370-376, provide the decoding operation for the address to determine whether the address is in the upper 2,048 bytes or the lower 2,048 bytes of the address space. As described hereinabove, the address space is selectable to be in either the upper portion or the lower portion of the address space. However, it should be understood that the decode circuitry could be designed such that the address space could be at any position within the address space of the memory, and the memory locations do not necessarily have to be adjacent.

The logic gates 392, 394, 396 and 398 determine whether the upper 2,048 bytes or the lower 2,048 bytes has been selected in the data stored in the control register 32. This information in conjunction with the address will determine whether the internal array is accessed. Of course, the Invoke True signal must have been generated and latched in order to realize that this operation has been invoked.

The output of gate 386 is connected to one input of a NAND gate 402, the other input of which is connected to the output of a NAND gate 404. Gate 404 has one input thereof connected to the PRWUP signal and the other input thereof connected to the 07FF1 bit of the control register 32. The other input of gate 402 is connected to the output of gate 378. The output of gate 404 provides the CECUPBC switch control signal, the output of gate 402 provides the CECUPC switch control signal and the output of gate 386 is input through an invertor 406 to provide the switch control signal CECONT. These three outputs are input to a Chip Enable switch 408 to provide the CE$_{con}$ output. The switch 408 is essentially a pin driver with the signal CECUPBC driving the output to the voltage V$_{cc}$, the signal CECUPC driving the output to an internal voltage V$_{co}$, and the signal CECONT drives the output to a low voltage.

Figure 11:
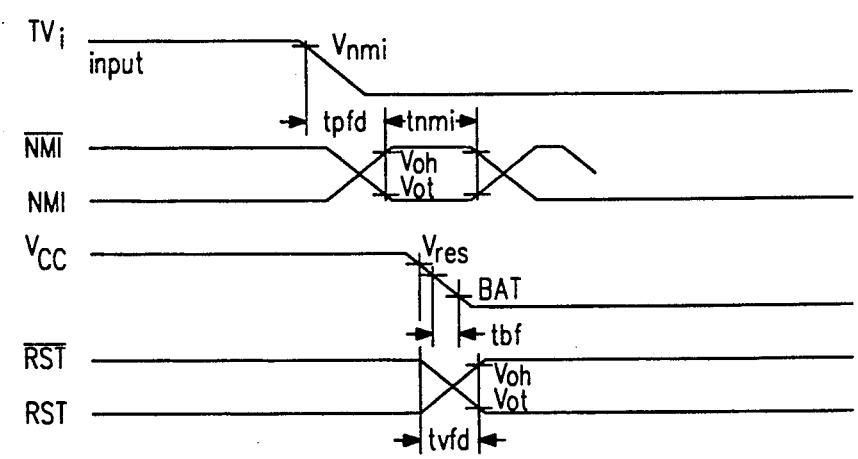
FIGS. 11 and 12 illustrate timing diagrams for the operation of the controller.

Referring now to FIG. 11, there is illustrated a timing diagram for the power down timing sequence. The V$_{nmi}$ threshold is reached whenever the input voltage TV$_i$ falls below the internal threshold. At this point, the NMI signal goes from an active low to an active high in a time tpfd. The NMI signal stays at an active high for a time period t$_{nmi}$. The voltage V$_{CC}$ decreases in voltage below the threshold voltage V$_{res}$, which can be at an internally programmed threshold voltage of 4.25 volts or 4.75 volts. At this point, the signal RST goes from an active low to an active high in a time period tvfd. RST stays at an active high and then slews down with V$_{CC}$.

Figure 12:
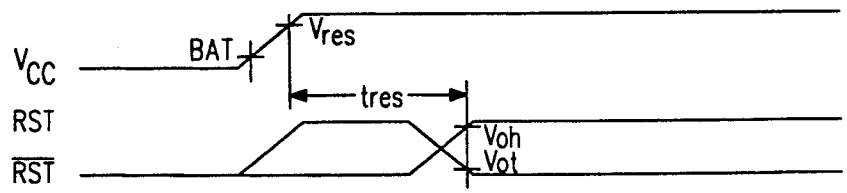

Referring now to FIG. 12, there is illustrated a timing diagram for the power up operation. When V$_{CC}$ goes above the battery voltage, the RST signal is latched to an active high and rises up to the V$_{CC}$ level. When V$_{CC}$ crosses the V$_{res}$ threshold for a time t$_{res}$, RST goes active low. When RST goes active low, the CPU 10 can initiate an operation.

In summary, there has been provided a microprocessor power down control system that provides a number of thresholds to both detect early power fail conditions and also to write protect the volatile memory associated with the microprocessor. Upon detection of a power fail condition, an interrupt signal is output to the microprocessor to indicate this condition. The microprocessor then has a predetermined amount of time within which to execute instructions to power down and store critical information from the internal registers in the microprocessor to an external volatile memory. When the supply voltage falls below a predetermined threshold that represents an out of tolerance condition for both the processor and the memory, the memory is write protected. A battery backup is also provided to render the memory non-volatile.

Although the preferred embodiment has been described in detail, it should be understood that various changes, substitutions and alterations can be made therein without departing from the spirit and scope of the invention as defined by the appended claims.

What is claimed is:

1. A power fail controller for detecting early failure of a power supply for providing power to a system having a processor and a volatile memory, comprising:
    an early power fail detection circuit for detecting a potential power supply failure in the power supply and generating a power fail signal for output to the processor;
    an out of tolerance detection circuit for detecting when the power supply is out of tolerance in accordance with predetermined tolerance parameters and generating an out of tolerance signal for output to the processor;
    a non-volatile memory accessible by the processor for storage of information therein, said information including executable instructions that are directly executable by the processor; and
    an inhibit circuit for inhibiting the processor from accessing said non-volatile memory when said out of tolerance signal is generated.

2. The controller of claim 1 wherein said out of tolerance signal is input to the processor.

3. The controller of claim 1 wherein said out of tolerance detection circuit detects the voltage of the power supply and generates said out of tolerance signal when the voltage of the power supply falls below a first predetermined voltage, and said early power fail detection circuit detects the voltage of the power supply and generates said power fail signal when the voltage of the power supply falls below a second predetermined voltage, the voltage below which said out of tolerance detection circuit generates said out of tolerance signal being less than the voltage below which said early power fail detection circuit generates said power fail signal.

4. The controller of claim 3 and further comprising:
    a write protect circuit for write protecting the volatile memory in response to generation of said out of tolerance signal;
    a backup battery; and
    a backup circuit for connecting the battery to supply power to at least the volatile memory when the power supply to at least the volatile memory is less than a predetermined backup voltage.

5. The controller of claim 4 wherein said predetermined backup voltage is less than the voltage at which said out of tolerance detection circuit generates said out of tolerance signal.

6. The controller of claim 4 wherein the voltage of the power supply at which said write protect circuit write protects the volatile memory is substantially equal to said first predetermined voltage below which said out of tolerance detection circuit generates said out of tolerance signal voltage.

7. The controller of claim 4 wherein said backup circuit comprises:
    a comparator for determining when the voltage of the power supply to at least the volatile memory is less than said predetermined backup voltage;
    a first terminal connected to said backup battery;
    a second terminal connected to the power supply;
    an output terminal connected to the power supply; and
    a switch for connecting said first terminal to said output terminal when the voltage on said first terminal is above said backup voltage and for connecting said first terminal to said output terminal when the voltage on said first terminal is less than said backup voltage.

8. The controller of claim 4 wherein said early power fail detection circuit comprises:
    a first reference voltage; and
    a comparator for comparing said first reference voltage to a voltage representative of the power supply voltage, said comparator operable to generate said power fail signal for output to the processor when the voltage representative of the power supply voltage to the processor and the volatile memory is less than said first reference voltage.

9. The controller of claim 8 wherein said out of tolerance detection circuit comprises:
    a reference voltage;
    a comparator for comparing a voltage representative of the voltage power supply of the processor and volatile memory to said reference voltage and generating said out of tolerance signal when the voltage of the power supply is less than said reference voltage.

10. The controller of claim 4 wherein said write protect circuit comprises:
    a chip enable switch for receiving memory control signals from the processor that are directed toward the volatile memory for controlling writing of data thereto; and
    a switch control circuit for controlling said switch to route the memory control signals through to the volatile memory in the absence of said write protect signal, and for inhibiting the memory control signals from being transferred from the processor to the volatile memory when said write protection signal is present.

11. The controller of claim 1 wherein the processor operates within a predetermined address space and said non-volatile memory comprises:
    a hidden memory for storing said executable instructions as critical information utilized by the processor during execution of a program; and
    access circuitry for allowing the processor to access said hidden memory within the predetermined address space associated with the processor in response to access signals received from the processor.

12. The controller of claim 1 and further comprising a non-volatile status/control register for storing control information utilized by said power fail detection circuit and out of tolerance detection circuit during the operation thereof and operating in response thereto, and status information relative thereto, said status/control register accessible by the processor to receive control information and output status information.

13. A processor control system, comprising:
a central processing unit for executing instructions within a predetermined address space;
an external memory controlled by said central processing unit in response to memory control signals received from said central processing unit for access of data from said external memory by said central processing unit in a read mode and for transfer of data to said external memory from said central processing unit in a write mode;
said central processing unit and said external memory each having a power supply associated therewith; and
a power fail controller, including:
a power fail detector for determining when said power supply associated with at least said central processing unit falls below a first threshold voltage, said power fail detector operable to generate a power fail signal in response to said power supply voltage associated with said central processing unit falling below said first threshold voltage, said power fail detector outputting said power fail signal to said central processing unit, said central processing unit operable to go into a power down sequence in response to receiving said power fail signal and continuing to execute instructions in said power down sequence,
a non-volatile memory accessible by said central processing unit for storage of information including executable instructions therein in association with a predetermined portion of the predetermined address space associated with said central processing unit when said power fail signal is generated, and
a mapping circuit for mapping said stored information in said non-volatile memory to said predetermined portion of said predetermined address space when said non-volatile memory is accessed.

14. The processor control system of claim 13, and further comprising:
an out of tolerance detector for detecting when said power supply associated with at least said external memory falls below a second threshold and generating an out of tolerance signal in response thereto, said second threshold being lower than said first threshold; and
a write protect circuit for inhibiting the writing of data to said external memory from said central processing unit in response to generation of said out of tolerance signal.

15. The processor control system of claim 14 wherein said external processing unit and said external memory have a common power supply.

16. The processor control system of claim 14 wherein said out of tolerance detector transmits said out of tolerance signal to said central processing unit.

17. The processor control system of claim 14 wherein said external memory is a volatile memory and further comprising:
a backup power supply;
a detector for detecting when the voltage of said power supply associated with said external memory falls below a third threshold voltage; and
a switch having a first input terminal connected to said power supply associated with said external memory, a second input terminal connected to said backup power supply and an output terminal connected to a power supply input to at least said external memory, said switch operable to connect said first input terminal to said output terminal when the voltage of said power supply associated with said external memory is above said third threshold voltage and operable to connect said second input terminal to said output terminal when the voltage of said power supply associated with said external memory is less than said third threshold voltage.

18. The processor control system of claim 17 wherein said third threshold voltage substantially equals said backup power supply voltage.

19. The processor control system of claim 17 wherein said third threshold is less than said second threshold.

20. The processor control system of claim 14 wherein said write protect circuitry comprises an enable switch for being interposed between the memory control signals transferred from said central processing unit to said external memory, said enable switch operable to prevent transfer of the memory control signals from said central processing unit to said external memory for writing of data thereto when said out of tolerance signal is generated by said out of tolerance detector, said enable switch operable to generate control signals for input to said external memory indicating that writing thereto is inhibited.

21. The processor control system of claim 20 wherein writing of data to said non-volatile memory is inhibited by said write protect circuit when said out of tolerance signal is generated by said out of tolerance detector.

22. The processor control system of claim 13 wherein said mapping circuit operates in response to predetermined signals received from said central processing unit to map said non-volatile memory to said predetermined portion of said address space.

23. A power fail controller for detecting early failure of a power supply for a central processing unit and an associated external memory, the central processing unit operable to execute instructions within a predetermined address space, comprising:
an early power fail detection circuit for detecting a potential power supply failure in the power supply and generating a power fail signal for output to the central processing unit;
the central processing unit operable to go into a power down sequence in response to receiving said power fail signal and continuing to execute instructions in said power down sequence;
a non-volatile hidden memory for storing critical instructions including executable instructions;
an access circuit for allowing the central processing unit to access said hidden memory when the central processing unit is in said power down sequence in response to generation of said power fail signal by said power fail detector; and
said hidden memory occupying a predetermined portion of the address space associated with the central processing unit, said access circuitry operable to map said hidden memory in said predetermined portion of the address space associated with the central processing unit during said power down sequence of the central processing unit.

24. The power fail controller of claim 23 and further comprising:
an out of tolerance detection circuit for detecting when the power supply is out of tolerance and generating an out of tolerance signal;
a write protect circuit for write protecting the external memory, the external memory being a volatile memory, said write protect circuit operating in response to the presence of said out of tolerance signal;
a backup battery; and
a backup circuit for connecting said backup battery to supply power to at least the external memory when the voltage of the power supply is less than a predetermined backup voltage.

25. The power fail controller of claim 24 wherein writing of data to said hidden memory is inhibited by said write protect circuit when said out of tolerance signal is generated by said out of tolerance detector.

26. The power fail controller of claim 24 wherein said access circuitry operates in response to predetermined signals received from the central processing unit to access said hidden memory.

27. A method for controlling operation of a central processing unit and an associated volatile external memory during power failure of an associated power supply, the central processing unit operable to execute instructions within a predetermined address space, comprising the steps of:
detecting a potential power supply failure in the power supply and generating a power fail signal for output to the central processing unit in response to detecting the potential power supply failure;
detecting when the power supply to at least the volatile external memory is out of tolerance relative to predetermined operating parameters of the volatile external memory and generating an out of tolerance signal in response to detecting when the power supply is out of tolerance;
operating the central processing unit in a power down sequence when the power fail signal is generated and the out of tolerance signal is not generated;
providing a non-volatile memory for storing critical information therein including executable instructions; and
mapping the non-volatile memory to a predetermined portion of the predetermined address space during the power down sequence such that the executable instructions associated with the non-volatile memory are accessible by the central processing unit.

28. The method of claim 27, and further comprising:
write protecting the volatile external memory in response to generation of the out of tolerance signal;
providing a backup battery; and
connecting the backup battery to supply power to at least the external volatile memory when the voltage of the power supply is less than a predetermined backup voltage.

29. The method of claim 28 and further comprising inputting the out of tolerance signal to the central processing unit.

30. The method of claim 28 wherein the voltage of the power supply at which the out of tolerance signal is generated is less than the voltage of the power supply at which the power fail signal is generated.

31. The method of claim 28 wherein the predetermined backup voltage of the power supply is less than the voltage at which the out of tolerance signal is generated.

32. The method of claim 28 wherein the step of write protecting the volatile external memory comprises:
providing a chip enable switch;
receiving memory control signals generated by the central processing unit on an input, which memory control signals are output by the central processing unit to control access to the external memory;
connecting the output of the chip enable switch to the control input of the volatile external memory; and
controlling the chip enable switch to route the memory control signals from the central processing unit to the external memory in the absence of the out of tolerance signal and for inhibiting the memory control signals from being transferred to the volatile external memory when the out of tolerance signals are generated.

33. A method for controlling operation of a central processing unit and an associated external memory that is controlled by the central processing unit in response to memory control signals received from the central processing unit, the central processing unit operable to execute instructions in a predetermined address space, the central processing unit and the associated external memory having a power supply associated therewith, comprising the steps of:
determining when the voltage of the power supply associated with at least the central processing unit falls below a first threshold voltage and generating a power fail signal in response thereto for output to the central processing unit;
the central processing unit operable to go into a power down sequence in response to receiving the power fail signal and continuing to execute instructions in the power down sequence;
detecting when the voltage of the power supply associated with at least the external memory falls below a second threshold voltage and generating an out of tolerance signal in response thereto, the second threshold voltage being lower than the first threshold voltage; and
inhibiting the writing of data to the external memory from the central processing unit in response to generation of the out of tolerance signal;
providing a nonvolatile hidden memory for storing critical instructions including executable instructions utilized by the central processing unit; and
mapping the nonvolatile hidden memory to a predetermined portion of the predetermined address space when the central processing unit is in the power down sequence in response to generation of the power fail signal such that the executable instructions stored in the nonvolatile memory are accessible by the central processing unit.

34. The method of claim 33 and further comprising transferring the out of tolerance signal to the central processing unit.

35. The method of claim 33 and further comprising:
providing a backup power supply;
detecting when the power supply to at least the external memory falls below a third threshold; and connecting the backup power supply to the external memory when the power supply falls below the third threshold.

36. The method of claim 35 wherein the third threshold voltage substantially equals the backup power supply voltage.

37. The method of claim 35 wherein the third threshold voltage is less than the second threshold voltage.

38. The method of claim 33 wherein the step of inhibiting the writing of data to the memory comprises:

interposing an enable switch between the memory control signals transferred from the central processing unit to the external memory; and controlling the enable switch to prevent the transfer of the memory control signals from the central processing unit to the external memory for writing of data thereto when the out of tolerance signal is generated.

39. The method of claim 33 and further comprising inhibiting writing of data to the hidden memory when the out of tolerance signal is generated.

40. The method of claim 39 wherein the step of mapping operates in response to predetermined signals received from the central processing unit.

* * * * *